(12) United States Patent
Van Driest et al.

(10) Patent No.: US 11,388,734 B2
(45) Date of Patent: Jul. 12, 2022

(54) CONCURRENT MULTI-RADIO RECEIVER (71) Applicant: GREENPEAK TECHNOLOGIES B.V., Utrecht (NL)

(72) Inventors: Hans Van Driest, The Hague (NL); Andrew Fort, Kessel Lo (BE); Bram van den Bosch, Berchem (BE)

(73) Assignee: QORVO INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 15/775,625

(22) PCT Filed: Nov. 12, 2015

(86) PCT No.: PCT/NL2015/050794
§ 371 (c)(1),
(2) Date: May 11, 2018

(87) PCT Pub. No.: WO2017/082719
PCT Pub. Date: May 18, 2017

(65) Prior Publication Data
US 2018/0324829 A1  Nov. 8, 2018

(51) Int. Cl.
*H04W 72/12* (2009.01)
*H04W 56/00* (2009.01)
*H04W 88/06* (2009.01)

(52) U.S. Cl.
CPC ........... *H04W 72/1215* (2013.01); *H04W 56/0015* (2013.01); *H04W 56/0085* (2013.01); *H04W 88/06* (2013.01)

(58) Field of Classification Search
CPC ................................. H04W 72/1215
See application file for complete search history.

(56) References Cited

U.S. PATENT DOCUMENTS

| 6,185,418 B1 * | 2/2001 | MacLellan | H04B 1/0003 455/418 |
| 8,386,892 B1 * | 2/2013 | Jamieson | H03M 13/373 714/780 |
| 2010/0135422 A1 * | 6/2010 | Lee | H04L 27/2602 375/260 |

(Continued)

FOREIGN PATENT DOCUMENTS

| CN | 104779972 A | 7/2015 |
| EP | 0998154 A2 | 5/2000 |

(Continued)

OTHER PUBLICATIONS

International Search Report and Written Opinion for PCT/NL2015/050794, dated Jul. 27, 2016, 14 pages.

(Continued)

*Primary Examiner* — Jason E Mattis
(74) *Attorney, Agent, or Firm* — Withrow & Terranova, P.L.L.C.

(57) ABSTRACT

Method for receiving data packet transmissions, wherein synchronization with a transmitter is accomplished based on detection of a preamble transmitted by the transmitter. A time multiplexing scheduling of a single hardware receiver arrangement is used, and the time multiplexing scheduling has a main time slot comprising a first listen period and a second listen period following the first listen period. In the first listen period a first type of synchronization detection is executed (e.g. IEEE 802.15.4), and in the second listen period a second type of synchronization detection different from the first type of synchronization detection is executed (e.g. BLE).

19 Claims, 4 Drawing Sheets

(56) References Cited

U.S. PATENT DOCUMENTS

| | | | | |
|---|---|---|---|---|
| 2010/0310009 | A1* | 12/2010 | Lakkis | H04J 13/0014 |
| | | | | 375/308 |
| 2015/0245351 | A1* | 8/2015 | Banerjea | H04H 20/71 |
| | | | | 370/338 |
| 2015/0319555 | A1 | 11/2015 | Cordeiro et al. | |
| 2015/0351084 | A1* | 12/2015 | Werb | H04W 4/70 |
| | | | | 370/329 |
| 2016/0165597 | A1* | 6/2016 | Konopacki, Jr. | H04W 72/0446 |
| | | | | 370/329 |
| 2016/0295629 | A1* | 10/2016 | Gubeskys | H04B 7/0456 |
| 2017/0207890 | A1* | 7/2017 | Liu | H04L 27/2602 |

FOREIGN PATENT DOCUMENTS

| | | | |
|---|---|---|---|
| EP | 2182762 | A2 | 5/2010 |
| GB | 2491906 | A | 12/2012 |
| KR | 20020082478 | A | 10/2002 |
| KR | 20100022446 | A | 3/2010 |
| WO | 0237770 | A2 | 5/2002 |
| WO | 2009093892 | A1 | 7/2009 |
| WO | 2014105893 | A1 | 7/2014 |

OTHER PUBLICATIONS

International Preliminary Report on Patentability for PCT/NL2015/050794, dated Feb. 1, 2018, 6 pages.

Written Opinion for International Patent Application No. PCT/NL2015/050794, dated Nov. 17, 2017, 6 pages.

Author Unknown, "Part 11: Wireless LAN Medium Access Control (MAC) and Physical Layer (PHY) Specifications," IEEE Standard 802.11-2012, Mar. 29, 2012, IEEE Computer Society, 2793 pages.

Examination Report for European Patent Application No. 15828886.0, dated May 3, 2019, 4 pages.

Author Unknown, "3rd Generation Partnership Project; Technical Specification Group GSM/EDGE Radio Access Network; Cellular System Support for Ultra Low Complexity and Low Throughput Internet of Things; (Release 13)," 3GPP TR 45.820 V1.0.1, Mar. 2015, 3GPP Organizational Partners, 147 pages.

First Office Action for Chinese Patent Application No. 2015800849660, dated Jun. 3, 2020, 11 pages.

Notice of Preliminary Rejection for Korean Patent Application No. 1020187016680, dated Nov. 3, 2021, 4 pages.

Notice of Allowance for Korean Patent Application No. 1020187016680, dated May 9, 2022, 5 pages.

* cited by examiner

| 802.15.4 Pre. symbol 1 ( 16 μs ) | 802.15.4 Pre. symbol 2 ( 16 μs ) | ... |

Fig. 2B

| BLE Pre. ( 8 μs ) | BLE Access Adress ( 32 μs ) |

CONCURRENT MULTI-RADIO RECEIVER

This application is a 35 USC 371 national phase filing of PCT/NL2015/050794, filed Nov. 12, 2015, the disclosure of which is incorporated herein by reference in its entirety.

FIELD OF THE INVENTION

The present invention relates to a method for receiving data packet transmissions, wherein synchronization with a transmitter is accomplished based on detection of a preamble transmitted by the transmitter. In a further aspect, the present invention relates to a concurrent multi-radio receiver comprising an antenna input for receiving transmitted data blocks associated with either a first type of synchronization detection or a second type of synchronization detection different from the first type, and a processing unit connected to the antenna input.

PRIOR ART

International patent publication WO2009/093892 discloses a method and arrangement for determining a characteristic form of an input signal, in particular a preamble signal having a sequence of M similar data symbols. This may be applied specifically in low data rate RF communication networks, such as networks employing the IEEE 802.15.4 standard.

SUMMARY OF THE INVENTION

The present invention seeks to provide a solution to receive transmissions from two types of transmitters using a single hardware architecture in the receiver. The term 'type of transmitter' in this document applies to the transmitters using different standards, e.g. using a different physical layer with different preambles and modulation schemes.

According to the present invention, a method according to the preamble defined above is provided, wherein the method further comprises using a time multiplexing scheduling of a single hardware receiver arrangement, the time multiplexing scheduling having a main time slot comprising a first listen period and a second listen period following the first listen period, wherein in the first listen period a first type of synchronization detection is executed, and in the second listen period a second type of synchronization detection different from the first type of synchronization detection is executed. It is noted that synchronization detection also encompasses identification.

The first type of synchronization detection may be associated with a spread spectrum based transmission, e.g. based on the IEEE 802.15.4 (ZigBee) standard. The second type of synchronization detection may be associated with a non spread spectrum based transmission, such as Bluetooth or BLE (Bluetooth Low Energy).

SHORT DESCRIPTION OF DRAWINGS

The present invention will be discussed in more detail below, using a number of exemplary embodiments, with reference to the attached drawings, in which

FIG. 3a-h show embodiments of time multiplexing schedules according to the present invention;

DETAILED DESCRIPTION OF EXEMPLARY EMBODIMENTS

Various embodiments of a cost-effective low-power receiver are described below, which can listen for data packets originating from transmitters using two different types of standards/protocols, e.g. IEEE 802.15.4 packets (as used by ZigBee or Thread) and Bluetooth Low Energy (BLE) packets. Presently available solutions use either two separate radio receivers, or receivers which are e.g. software configurable for reception of one of multiple (two) types of standards/protocol transmissions. The first type is relatively expensive (requires double the amount of hardware) and the other is not capable of autonomous concurrent reception. E.g. chips implementing such a receiver have to explicitly choose to listen for either BLE or IEEE 802.15.4 packets. The disclosed invention embodiments as described below can concurrently listen for BLE packets and 802.15.4 packets using a single radio receiver.

Figure 1:
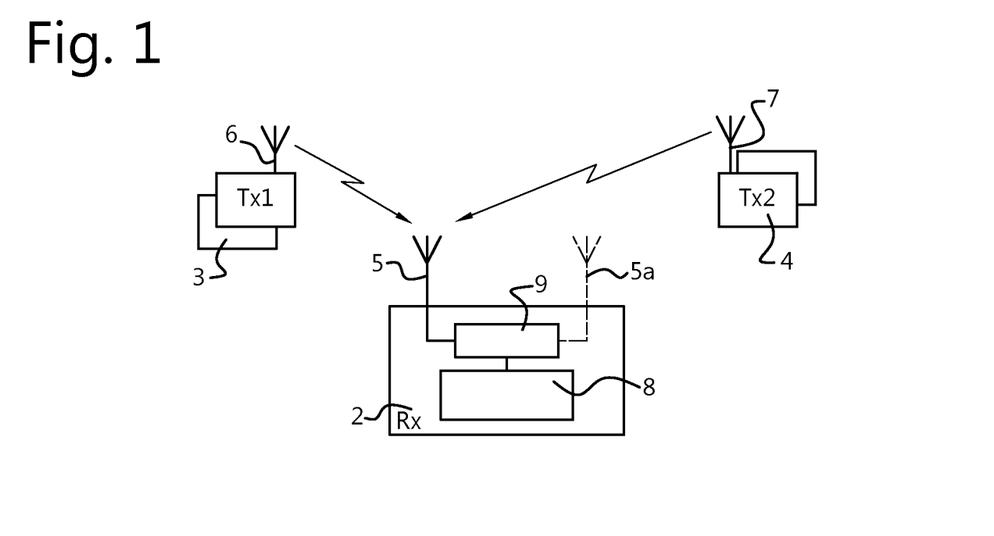
FIG. 1 shows a schematic diagram of a system employing two different types of synchronization detection in a single hardware receiver.

In FIG. 1 a schematic diagram is shown of a system employing two standards/protocols for data transmission. A receiver 2 with an associated antenna 5 is capable of receiving data packets from either a first type of transmitter 3 (Tx1) or a second type of transmitter 4 (Tx2), each having an associated antenna 6, 7, respectively. It is noted that the receiver 2 may be fitted with a secondary antenna 5a, e.g. in order to be able to implement an antenna diversity scheme. Furthermore, the receiver 2 comprises a processing unit 8 connected to the antenna 5 (and secondary antenna 5a), or to an antenna input allowing connection to the antenna 5. The processing unit is arranged to execute any one of the method embodiments described below. The receiver 2 may further comprise a hard-limiting radio front-end 9 connected between the antenna input and the processing unit 8, the function of which will be explained below.

A possible implementation of such a system using two different standards/protocols could be that all the lights in a house are connected to a network operating with IEEE 802.15.4 (such as ZigBee or Thread). For example ZigBee Light Link (ZLL) is the networking protocol. At the same time that all the lights are connected to and listening to frequency channels of the ZLL network, they are simultaneously listening to (scanning) the BLE channels for new connections. In this manner, the user can control the lights in his proximity via a BLE radio in e.g. their smart-phone or tablet, while the ZigBee network ensures that all lights in the home are connected and can adapt their state accordingly. For example, if the user leaves the house he can send a "turn all lights off" BLE command to a nearby light using a touch or voice recognition feature on the smart phone, and this information can then be relayed to the larger ZLL network ensuring that all lights in the house are notified to turn off.

Figure 2A:
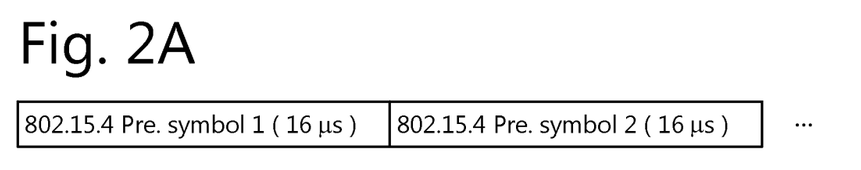
FIGS. 2a and 2b show preamble structures of two preambles associated with different types of synchronization detection.
Figure 2B:
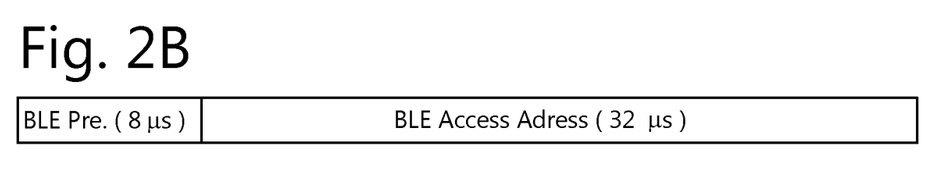

FIG. 2a shows the timing sequence of an exemplary spread spectrum data transmission scheme, in this case specifically of an IEEE 802.15.4 RF channel, where in the preamble of the data packet, a preamble data symbol of 16 µs is repeated (e.g. 8 times, the first two shown as '802.15.4 Pre. Symbol 1 (16 us)' and '802.15.4 Pre. Symbol 2 (16 us)') to form an entire preamble part of a data packet. FIG. 2b shows a preamble of a data packet used in a different type of protocol/standard being used, in this specific case Bluetooth Low Energy (BLE). Here, a BLE preamble of 8 µs ('BLE Pre. (8 µs)') is followed by a BLE Access Address taking 32 µs ('BLE Access Address (32 µs)'). In many applications, the BLE Access Address part is known or predictable, and can be used as an extended preamble allowing a longer available time to detect the preamble of such a transmission.

Figure 3A:
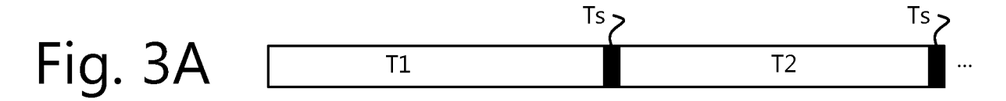

In generic terms and shown schematically in the timeline of FIG. 3a, the present invention relates to a method for receiving data packet transmissions, wherein synchronization with a transmitter is accomplished based on detection of a preamble transmitted by the transmitter. The method further comprises using a time multiplexing scheduling of a single hardware receiver arrangement, the time multiplexing scheduling having a main time slot comprising a first listen period T1 and a second listen period T2 following the first listen period T1. In the first listen period T1 a first type of synchronization detection is executed, and in the second listen period T2 a second type of synchronization detection different from the first type of synchronization detection is executed. Synchronization detection herein is understood as the first step in an RF data packet communication set-up, and is understood to also encompass e.g. identification of the transmitter or transmitted data packet.

The first type of synchronization detection is e.g. associated with a spread spectrum based transmission, such as IEEE 802.15.4 based transmissions, e.g. ZigBee. The second type of synchronization detection may be associated with a non spread spectrum based transmission, e.g. Bluetooth or BLE based transmissions. Having different types of synchronization detection allows to effectively and concurrently listen to two types of data packet transmissions with a high possibility of proper detection. E.g. when a detectable part (preamble) of a data packet transmission using the second type of synchronization detection is longer than a detectable part (preamble) of a data packet transmission using the first type of synchronization detection, it is possible to ensure that no preamble will be left undetected, even if the preambles of both transmitters would start at exactly the same time. In that case, the preamble using the second type of synchronization detection will still be ongoing after the first listen period T1 has ended, and the transition to the second listen period T2 has been made.

In a further embodiment, the first type of synchronization detection is based on detecting a data symbol in a preamble of the data packet, and the duration of the time slot is sufficient for detection of the data symbol. In other words, the total duration of the time slot (T1+T2) is sufficiently long for processing correlation calculations related to the first type of synchronization in the second listen period T2, after receiving the data symbol in the first listen period T1.

FIG. 3a-h show a few possible time-multiplexing schedules implementing the multi-standard listening method embodiments of the present invention. In this case the examples are related to the IEEE 802.15.4 preamble and BLE preamble/access code structures as shown in FIGS. 2a and 2b for reference. In each example, a first slot represents the time spent listening to an IEEE 802.15.4 RF channel (used in ZigBee or Thread), i.e. a first listen period T1, and a second slot represents the time spent listening to a BLE RF channel, i.e. a second listen period T2.

A black part Ts on each time line represents the time needed to switch between listening from one standard to the other. In practice, depending on the design of the RF radio front-end in the receiver 2, this switching time Ts can be dependent on an RF analogue filter response, a time period needed for a frequency synthesizer of the receiver 2 to settle to a new frequency, or the time needed for any gain control mechanism of the receiver 2 to converge. In general terms, the time slot may comprise a switching time period, e.g. between a first listen period T1 and a subsequent second listen period T2 (and between a second listen period T2 and a subsequent first listen period T1).

As an element of the present invention embodiments, the time multiplexing schedule should be such that the radio receiver 2 is arranged not to listen to the RF channel of one standard for a period of time that is longer than the other standard's preamble. For example, if listening to the IEEE 802.15.4 channel for 16 µs (as in the schedule shown in FIG. 3a), the arrival time of the much shorter 8 µs BLE could be missed. On the other hand, in the case of BLE, the access address is known by the receiver 2 and can therefore be used as an extension of the BLE preamble in the detection process. By using the access address in this manner, the present invention time slot (T1+T2) could even be extended to be as long as the entire 8 µs BLE preamble+32 µs access address (i.e. 40 µs) without a risk of missing the BLE packet. Thus, the listening schedule as shown in FIG. 3a wherein the first listen period T1 is equal to second listen period T2 (T1 and T2 both 16 µs) is still possible. While this approach has the drawback that a portion of the access address will not be decoded by the receiver 2, it can lead to important performance and complexity benefits as discussed further in the following sections.

Following the above, in a specific embodiment, the second type of synchronization detection is associated with a non spread spectrum based transmission, such as Bluetooth or BLE, wherein synchronization detection includes a synchronization on a preamble and access address part of a received data packet.

Alternatively, the listening schedule can be chosen so that the BLE and/or IEEE 802.15.4 preambles are gathered in shorter time-slots which are then combined to perform the detection. In a further embodiment, the first listen period T1 and the second listen period T2 are sub-divided in interleaved first listen sub-periods T1' and second listen sub-periods T2'.

Figure 3B:
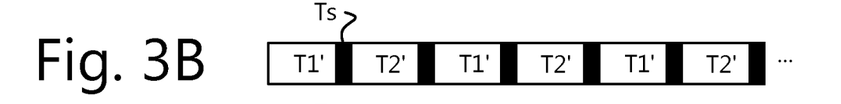

One example of this is shown by the schedule of FIG. 3b where each standard is listened to for about 4 µs (i.e. the first and second sub-periods T1' and T2' are both equal to 4 µs (with each time a switching time period Ts in between). Each sub-period T1', T2' is too short for reliable detection by itself, however, multiple sub-periods T1', T2' are combined together and used as part of the detection process. More detailed methods for achieving this are discussed below.

Further alternative timing embodiments can be envisaged, e.g. wherein the time slot comprises n first listen sub-periods T1' and n second listen sub-periods T2', n being an integer larger than 1. The example where n=4 is the timing diagram shown in FIG. 3b, and the example where n=3 is shown in FIG. 3d, with equal sub-periods T1', T2' of 5.3 µs.

Figure 3C:
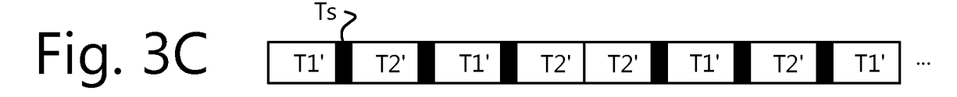
Figure 3D:
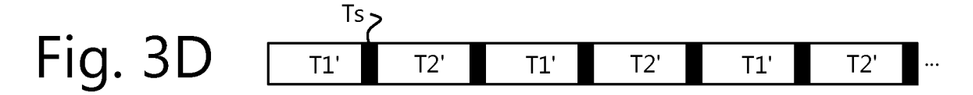

One further particular exemplary embodiment of a schedule is shown in the timing diagram of FIG. 3c. Instead of switching back and forth between BLE and IEEE 802.15.4 in a regular manner (as in the embodiments shown in FIGS. 3a, b and d), two second listen sub-periods T2' are allocated adjacent to each other. This optimization also ensures that a complete IEEE 802.15.4 preamble symbol interval is gathered for analysis, as will be explained in further detail with reference to FIG. 4 below. More generically, two of the first or second listen sub-periods T1', T2' are concatenated in this embodiment, i.e. two second listen sub-periods T2' are adjacent to each other as shown in FIG. 3c (as an alternative of course this could also apply to two of the first listen sub-periods T1'. In different terms, a second half of the first and second listen sub-periods T1', T2' is reversed in time order from a first half of the first and second listen sub-periods T1', T2'.

Figure 4:
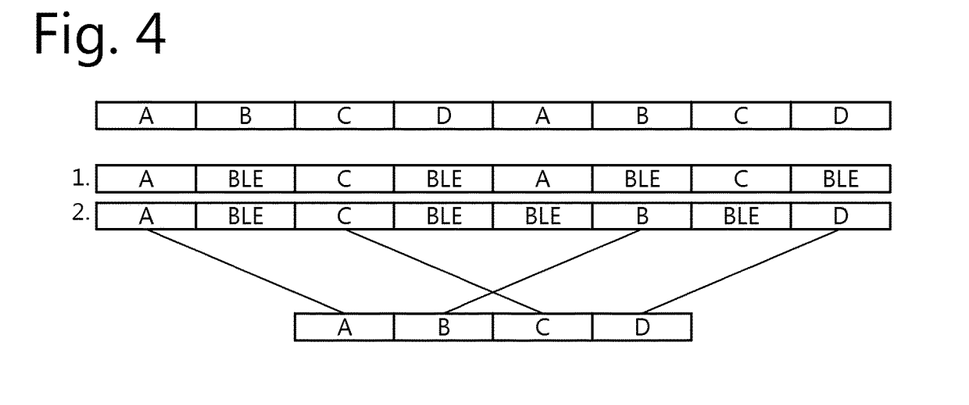
FIG. 4 shows an explanatory diagram of concurrent radio reception.

The top line of FIG. 4 shows a particular arrival time of an IEEE 802.15.4 packet having two subsequent preambles symbols relative to the two different listening schedules as shown in FIG. 3b and FIG. 3c. The IEEE 802.15.4 preamble consists of a repeating pattern of eight 16 µs preamble symbols (only two are shown) each having the same direct-sequence spread spectrum code. For demonstration purposes, each preamble symbol has been divided into four parts labelled "A" through "D" in FIG. 4. If listening to the two different types of standards/protocols using a regular pattern (embodiment of FIG. 3b, line labelled '1.' in FIG. 4), only samples would be gathered of the preamble symbol code from parts "A" and "C", while missing the information in parts "B" and "D". Note that this would assume an almost zero switching time Ts between each change-over from the first type of synchronization detection to the second one and vice-versa.

An improved scheme is the embodiment shown FIG. 3c (or line labelled '2.' in FIG. 4) where the multiplexing schedule has been altered to ensure all parts of an IEEE 802.15.4 preamble symbol ("A"-"D") are gathered for analysis. Note that since IEEE 802.15.4 uses an 8 times repeated preamble symbol which consists of 32 code elements, the same arguments apply regardless of the arrival time of the data packet. There are several advantages for collecting signal samples over a time interval corresponding to one preamble symbol interval for analysis, as it is possible to take advantage of the properties of 32 code element sequence of a preamble symbol, the repeated 32 code element sequence is always the same yielding more predictable performance, and covering with signal samples during the duration of one preamble symbol interval always the 32 code element sequence can reduce computational complexity.

For practical applications, the following observations can be made. First, the IEEE 802.15.4 preamble symbol code sequence used in the physical layer preamble is poorly correlated with a narrowband interferer. However, if only a portion of the code is used, the code's CW interference rejection properties can be severely compromised. Furthermore, examination of IEEE 802.15.4 partial code sequences reveal low frequency portions containing less timing information. This can result in less accurate timing/frequency acquisition accuracy and hence reduced sensitivity. Second, by obtaining a complete synchronization symbol A-D, predictable performance may be achieved regardless of when the packet arrives. This eases development and allows the designer to optimize performance for a particular received sequence. However, if only a partial symbol is used, several sequences can show up in the analysis window depending on the arrival time of the packet. This complicates the design and potentially reduces sensitivity. Third, if a complete code sequence is collected, this can allow for hardware simplification during any subsequent analysis involving cross-correlation against the known sequence. This aspect is discussed in more detail below. It is noted that the multiplexing schedule shown in FIG. 3c is not the only schedule which will ensure a complete preamble period is collected for analysis. For example, the multiplexing schedule shown in FIG. 3d achieves the same goal. In this case, the IEEE 802.15.4 preamble symbol interval is split into three 5.3 µs parts instead of four 4 µs parts. Combining fewer time-slots for packet detection can provide some performance and complexity advantages.

Figure 3E:
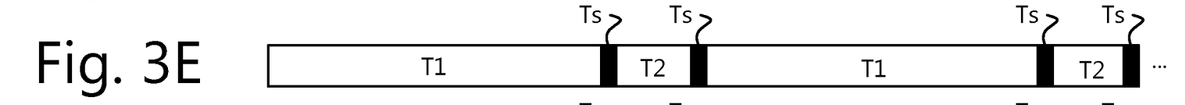

In further embodiment, as shown in the exemplary timing diagrams in FIG. 3e-h, the first listen period T1 is longer than the second listen period T2, e.g. T1=16 µs and T2=4 µs. This embodiment e.g. allows to listen to the better sensitivity standard for a longer time T1 compared to the standard having a worse sensitivity. For example, the IEEE 802.15.4 standard tends to operate at a much lower SNR requiring a longer listening period T1 to gather sufficient energy for reliable preamble or synchronization detection. In contrast, BLE operates at a much higher SNR enabling simple and fast packet detection mechanisms (see below). E.g. the listening schedule as shown in FIG. 3e may be more appropriate where the BLE time slot (second listen period T2) is kept very short while a much longer period of time is used to listen to IEEE 802.15.4 (first listen period T1). This allows for more robust detection of IEEE 802.15.4 and/or the introduction of further embodiments, exploiting sleep, multi-channel listening, or antenna diversity features.

In further alternative embodiments, during the first listen period T1 the first type of synchronization detection comprises one of a plurality of first type synchronization detection classes, such as active/sleep (FIG. 3f); channel diversity (FIG. 3g, indicated by channel 1/channel 2); antenna diversity (FIG. 3h, indicated by channel 1/antenna 1, channel 1/antenna 2), or even further combinations thereof.

Figure 3F:
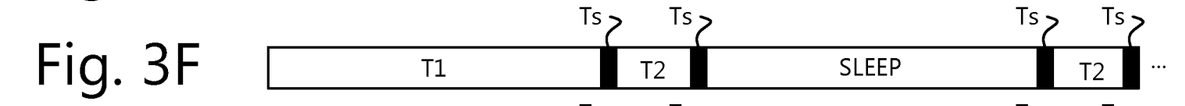

The time multiplexing schedule does not always need to be searching for packets during each and every first listen period T1. Since many of the packet detection algorithms proposed in the following section can reliably detect a packet in only one single IEEE 802.15.4 preamble symbol of the eight preamble symbols provided, it is possible for the radio to enter into a sleep mode for one or more first listen periods T1 without missing packets (as shown in FIG. 3f). This can result in a substantial power savings.

Figure 3G:
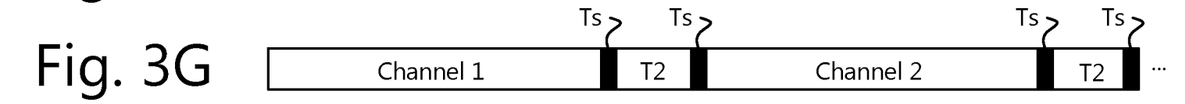
Figure 3H:
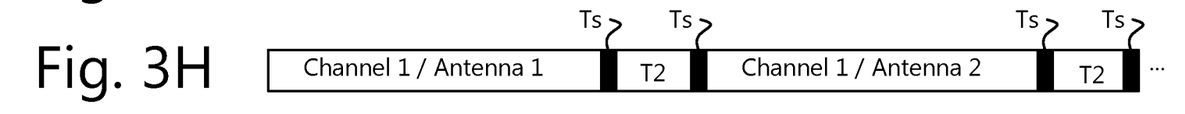

It is also noted that the time multiplexing schedule is not necessarily only searching for packets at two different frequencies corresponding to two standards. Rather, the frequency channel can be varied to monitor a broad range of channels in one or both standards. For example, the BLE time slots might cycle between the three advertisement channels looking for packets. Similarly, one of the IEEE 802.15.4 time slots might be monitoring traffic on one network while another time slot is used to search for new network connections on another frequency channel (schedule as shown in FIG. 3g). In addition, if a radio system is equipped with multiple antennas, the same channel can be listened to with a different antenna (e.g. the further antenna 5a of receiver 2 as shown in FIG. 1) to provide spatial diversity benefits (schedule as shown in FIG. 3h).

Furthermore, the scheduling of the first and second listen (sub-)periods T1, T2; T1', T2' can be adjusted in real-time depending on current application demands or current radio conditions. For example, the radio may only listen periodically for the presence of an IEEE 802.15.4 network. Once the network is found, the radio may adjust its time multiplexing schedule to have less "sleep" first listen periods T1 and listen more often to the newly-discovered IEEE 802.15.4 network. Similarly, if a very strong interferer blocking communication is identified on a first/second listen period T1, T2, the schedule can be adjusted at run time to modify, reduce or lengthen first/second listen periods T1, T2 as needed for best performance.

After several samples are collected for analysis according to an appropriate time multiplexing schedule as discussed in the previous section, the samples need to be analysed to determine if a packet has arrived. Typically, the analysis of the samples collected in the previous listen period T1; T2 from one standard will occur at the same time that data is collected in the current listen period T2; T1 from the other standard. In one embodiment, the method further comprises storing data received during a second listen period T2, and processing the stored data during a subsequent first listen period T1, and vice versa. As the first and second listen period T1, T2 are subsequent to each other, also the other situation may occur, i.e. the method further comprises storing data received during a first listen period T1, and processing the stored data during a subsequent second listen period T2.

This has the advantage that the analysis hardware in the receiver 2 can be re-used for both standards/protocols, and ensures the processing will be completed on time to begin detection of a packet at the start of the next time slot. While not strictly necessary, the algorithms described below are compatible with a hard-limiting radio front-end 9 as part of the receiver 2 (see FIG. 1). In addition to reducing the computational complexity of the digital part, the advantage of using a hard-limiting radio front-end 9 in the context of a concurrent radio receiver 2 is that no automatic gain control (AGC) is needed. This allows for both a simplification of the RF front-end 9, and more importantly for concurrent radio reception, faster switching time between standards/protocols since an AGC system will require time to converge to new gain settings.

Figure 5:
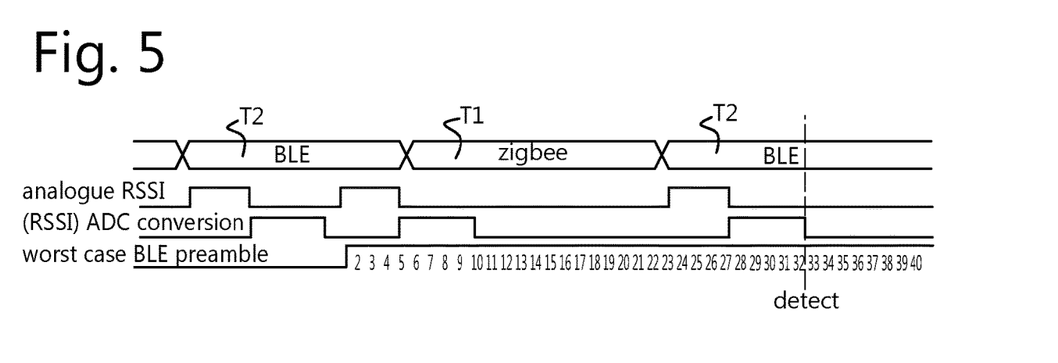
FIG. 5 shows a timing diagram of a second type of synchronization detection as used in an embodiment of the present invention.

In FIG. 5 the timing for reception and processing is indicated for the second type of synchronization detection, in this specific example for reception of BLE data packets. This timing diagram shows a worst-case timing for BLE detection. The top line shows the listening schedule between BLE and ZigBee, wherein a first listen period T1 and a second listen period T2 alternate and have the same length. In this basic scheme, 16 μs are used to listen to ZigBee followed by 16 μs to listen to BLE. There is a 1 μs switching time. During the BLE slot, i.e. second listen period T2, packets are detected by analyzing the RSSI of the received signal. If there is a step-increase in the RSSI (as indicated in the second line in FIG. 5), this indicates a packet has arrived and the BLE detection process is started. It takes about 4 μs for the analogue RSSI measurement circuit to settle, followed by 4 μs for the (RSSI) ADC conversion time (shown on the diagram of FIG. 5 on the third line). The bottom line shows the worst-case BLE preamble arrival time. The BLE preamble plus access address consists of 40 symbols, each 1 μs long: 8 preamble symbols and 32 (known) access address symbols. If detecting the BLE preamble is just missed after 4 μs, the BLE preamble will be detected again at symbol 33. All the data starting from symbol 24 (after the switching for BLE) will be stored in a FIFO and should be available for the subsequent DSP processing. This gives us a total of 17 symbols for the radio to acquire timing, frequency, and frame synchronization to robustly demodulate the rest of the BLE packet.

Figure 6:
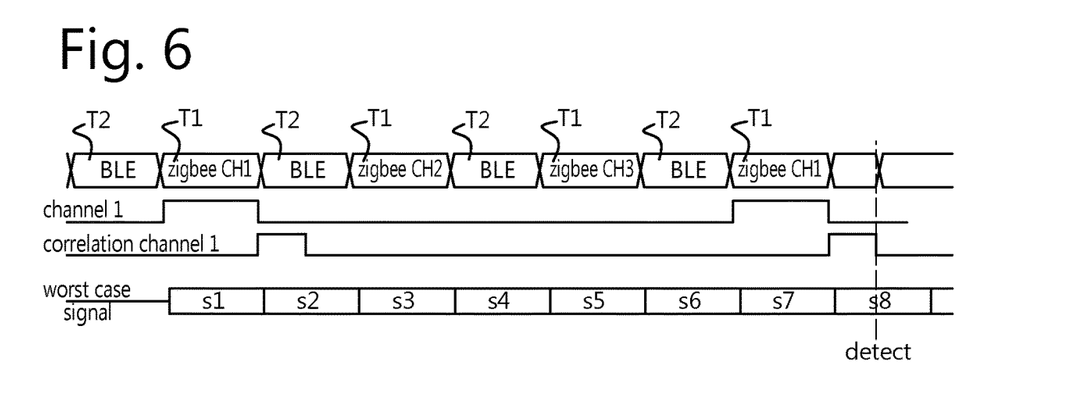
FIG. 6 shows a timing diagram of a first type of synchronization detection as used in an embodiment of the present invention.

In FIG. 6 the comparable timing is shown for the first type of synchronization detection, in this specific example ZigBee data packets. Also in this example, equal durations are used for the first listen period T1 and second listen period T2, as shown in the top line. The second line shows a ZigBee data packet preamble being present, received and stored during a first listen period T1, followed by a correlation processing period as indicated on the third line during a second listen period T2. Again, the bottom line shows a worst case timing where the first symbol of the ZigBee preamble is received just too late and will not directly result in a detection. As the preamble of a ZigBee data packet comprises a repetition of eight symbols, eventually the channel 1 signal will be detected. From this timing diagram, it is also clear that it would be possible to listen to e.g. all three ZigBee channels, or use antenna diversity in subsequent first listen periods T1. By shortening the second listen period to e.g. 4 μs, it would even be possible to listen to even more ZigBee channels, see also the embodiments described in relation to FIG. 3e-h above.

As already mentioned above, in a further embodiment, the first type of synchronization detection may comprise a cross correlation detection scheme. In the schematic diagram of FIG. 7 and FIG. 8 two alternatives are shown schematically for an implementation of a cross correlation detection scheme for symbol timing and carrier frequency recovery in direct-sequence spread spectrum systems, such as IEEE 802.15.4. The received sequence is cross correlated against a known preamble sequence (indicated by the blocks A-D at the top of the schematic diagram of FIGS. 7 and 8) at every (time offset) rotated version of the preamble symbol and at various carrier frequency offsets. This accomplished in a correlator unit 10, where the 1-bit coefficients are shifted for correlation operations using summation unit 12. After each (time offset) rotated version of the preamble symbol and every carrier frequency offset (CFO) has been evaluated in evaluation unit 13, the output with the highest magnitude is determined in block 14. If this magnitude is above a threshold, the packet data detection can begin using the estimated timing offset and frequency offset, in the processing block 15. A concurrent radio system receiver 2 requires this computation to be performed rapidly so that the packet arrival detection and acquisition procedure is completed on time to begin the packet data detection process, if necessary, at the start of the next first listen period T1.

As mentioned already, a hard-limiting radio front-end 9 as part of the receiver 2 is a good choice for concurrent radio as it does not require an automatic gain control circuit enabling fast switching time between standards/protocols. In addition, with only 1-bit resolution, for both data and correlation coefficients, the parallel processing of the diagram shown in FIG. 7 becomes computationally feasible for a low-cost low-power device. Finally, measurements and simulations have shown that this algorithm closely approximates the ideal full-precision performance for IEEE 802.15.4.

Figure 7:
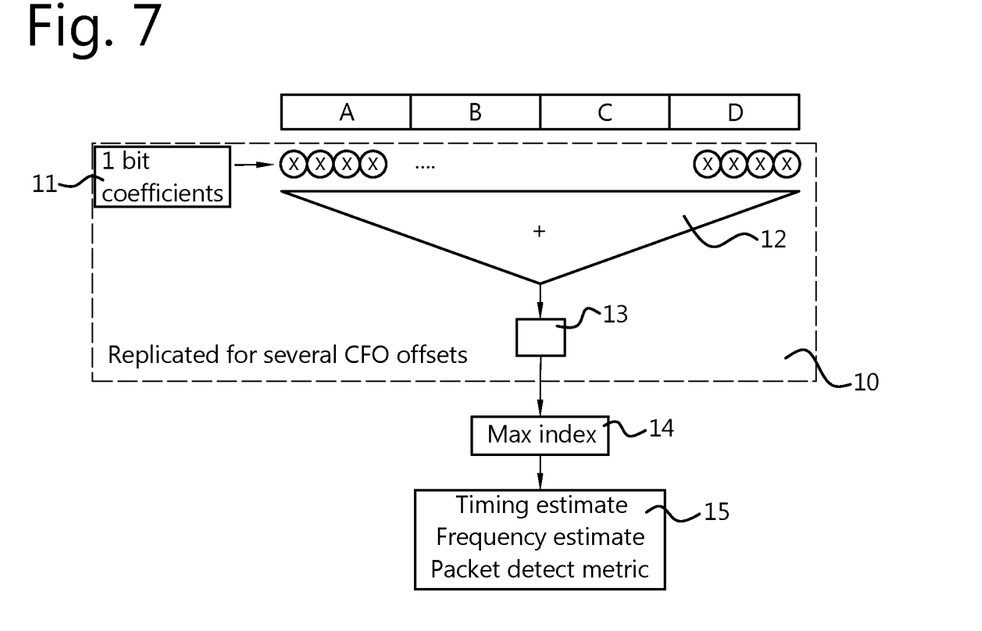
FIGS. 7 and 8 show two possible implementation variants of a correlation based synchronization detection scheme.

An important feature of the cross-correlation implementation as shown in FIG. 7 for concurrent radio is that an appropriate time-multiplexing schedule has been chosen so that a complete preamble period is gathered for analysis, as discussed above. This allows to more easily check all (time offset) rotated version of the preamble sequence by cyclically shifting either the 1-bit coefficients 11 or received signal data to perform correlations at each time offset. Or in other wording, the cross correlation detection scheme comprises cyclically shifting coefficients or received signal data to perform correlations at each time offset.

This algorithm has some drawbacks in the context of a concurrent mode radio receiver 2 with a timing schedules such as the ones described with reference to FIG. 3b-d, where the preamble is constructed from first listen periods T1 spread out in time. First, the observation time span between parts "A" and "D" increases since some time is spent listening to the other radio standard in second listen periods T2. This decreases the bandwidth of each correlator so that more parallel correlations are required to span the inaccuracy of the carrier frequency. For example, if half the time is spent listening to BLE and half the time listening to IEEE 802.15.4, then it would take twice as long to gather the necessary received signal data and hence twice the number of CFO correlators units 10 to achieve similar performance. To make matters worse, depending on the frequency synthesizer implementation, the phase of each part "A" to "D" may be unknown since the phase of the carrier frequency will have changed while listening to the other standard. To resolve these problems with no complexity increase, a non-linear correlation algorithm is provided in a further embodiment as shown in FIG. 8.

Figure 8:
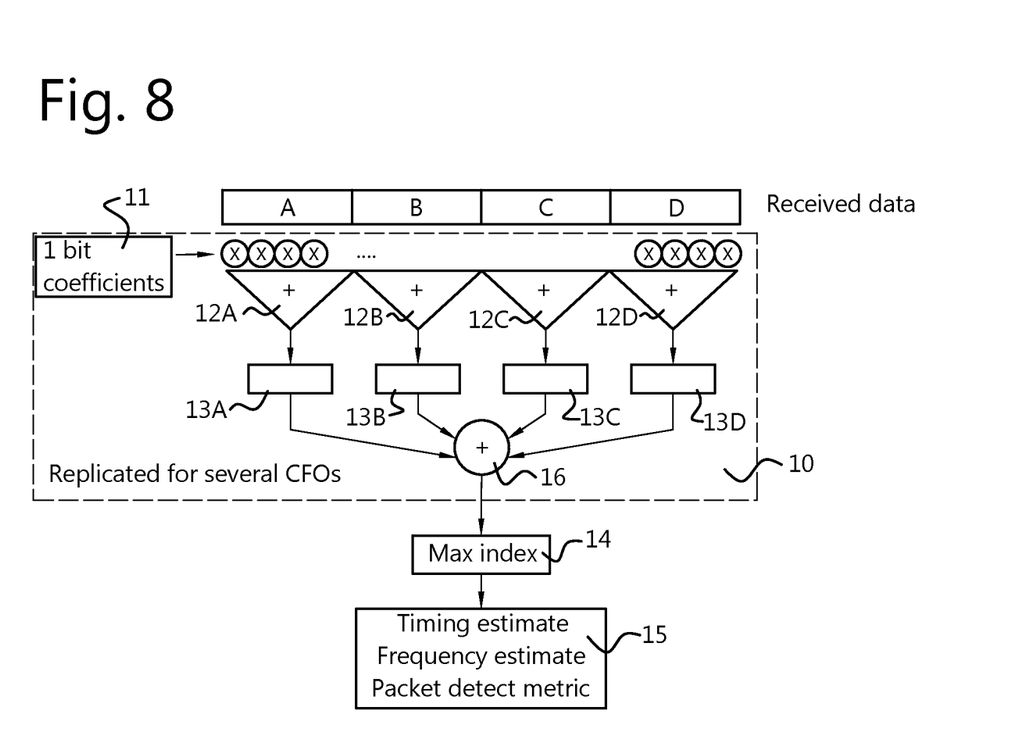

In this exemplary embodiment, the correlation over a full 16 μs preamble symbol is separated into four 4 μs parts according to the time multiplexing schedule as illustrated in FIG. 4, using summation units 12a-12d and evaluation units 13a-13d as illustrated in FIG. 8. The magnitude of each result (for part "A" to "D") is combined together in combiner 16 to detect the packet arrival and synchronize to the symbol timing of the received packet. The number of required correlators is then related to the observation time span of the shorter correlations so that the implementation complexity is decreased relative to the above described approach. For example, part "A" is only 4 μs compared to the 32 μs time span between parts "A" and "D". While this dramatically reduces the number of parallel CFO correlations saving power and area, it comes at some performance penalty since the code sequence properties of a preamble sub-symbol are limited by the shorter sequence and some correlation information is lost. To minimize the performance loss, the length of the first listen periods T1 can be increased so that less parts need to be combined together. E.g. using the timing as described with reference to FIG. 3d the preamble is divided into three equal parts of approximately 5.3 μs instead of four parts of 4 μs, achieving some performance improvement. In generic terms, the method may further comprise a subdivision using multiple cross correlators wherein a magnitude of each sub-correlation is combined. The number of multiple cross correlators then depends on the length of the first listen periods selected, i.e. four in the case of 4 μs parts, and three in the case of 5.3 μs parts. Alternatively, the evaluation units 13a-13d are implemented using a COordinate Rotation DIgital Computer (CORDIC) scheme, in order to detect the packet without losing performance. In this case, a CORDIC, or similar hardware block, is used to compensate the phase rotation of each part in order to reconstruct the preamble without losing phase information. So, again the method may further comprising a subdivision using multiple cross correlators wherein a phase of each sub-correlation is corrected by a phase rotation, and then combined.

In a further embodiment, the first and/or second type of synchronization detection comprises an energy based detection scheme, e.g. a Received Signal Strength Indicator (RSSI) based scheme. It is noted that the techniques for the first type and second type of synchronization detection are not mutually exclusive and can be combined for optimal performance. E.g. this embodiment may be used to listen to two BLE channels concurrently.

This embodiment allows to achieve an acceptable performance at a lower complexity, by using an estimation of e.g. the received signal strength to initially determine the arrival of a packet. In this way, a packet is detected whenever the received signal strength steps up above a certain threshold. A subsequent correlation against the preamble and/or some portion of the access address is then used to determine the symbol timing and carrier frequency offset. Or, in other words, the first and/or second type of synchronization detection further comprises a subsequent correlation based detection. This additional acquisition step can be done using any of the algorithms discussed above.

While detecting a packet by sensing an increase in the received signal strength could in principle be used for both IEEE 802.15.4 and BLE, it is most appropriate for detecting BLE packets. IEEE 802.15.4 uses spread spectrum so that the receiver can operate when the received signal strength is close to the noise level. In the presence of a narrowband interferer, the received signal strength of the desired packet will often be below the received signal level of the interferer and cannot be detected until after de-spreading. This renders a simple energy detection for IEEE 802.15.4 unreliable and the cross-correlation implementations described above with reference to FIGS. 7 and 8 are more appropriate. In contrast, BLE is a narrowband system that can only operate at a high signal to noise and interference ratio. This means that an increasing step in the received signal strength will always accompany the arrival of a packet making energy detection methods quite reliable.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. Method for receiving data packet transmissions, wherein synchronization with a transmitter is accomplished based on detection of a preamble transmitted by the transmitter, the method further comprising
using a time multiplexing scheduling of a single radio receiver realized in hardware comprising a hard-limiting radio front end coupled to at least one antenna input, the time multiplexing scheduling having a main time slot comprising a first listen period having a first type of synchronization detection and a second listen period having a second type of synchronization detection different from the first type of synchronization detection with the second type of synchronization detection following the first listen period,
wherein the time multiplexing scheduling is configured to detect the preamble and collect preamble symbols over a complete preamble period whenever the preamble extends from the first listen period into the second listen period and then to combine different received portions of the preamble that is repeated to form a full preamble that is used for synchronization with the transmitter.

2. Method according to claim 1, wherein the first type of synchronization detection is associated with a spread spectrum based transmission.

3. Method according to claim 1, wherein the second type of synchronization detection is associated with a non spread spectrum based transmission.

4. Method according to claim 3, wherein synchronization detection includes a synchronization on the preamble and access address part of a received data packet.

5. Method according to claim 1, wherein the first type of synchronization detection is based on detecting a data symbol in the preamble of a data packet, and the duration of the main time slot is sufficient for detection of the data symbol.

6. Method according to claim 1, wherein the main time slot comprises a switching time period between the first listen period and the second listen period.

7. Method according to claim 1, wherein the first listen period is equal to second listen period.

8. Method according to claim 1, wherein the first listen period and the second listen period are sub-divided in interleaved first listen sub-periods and second listen sub-periods.

9. Method according to claim 8, wherein the main time slot comprises n first listen sub-periods and n second listen sub-periods, n being an integer larger than 1.

10. Method according to claim 8, wherein two of the first or second listen sub-periods are concatenated.

11. Method according to claim 1, wherein the first listen period is longer than the second listen period.

12. Method according to claim 11, wherein during the first listen period the first type of synchronization detection comprises one of a plurality of first type synchronization detection classes.

13. Method according to claim 1, further comprising storing data received during the second listen period, and processing the stored data during a subsequent first listen period, and vice-versa.

14. Method according to claim 1, wherein the first type of synchronization detection comprises a cross correlation detection scheme.

15. Method according to claim 14, wherein the cross correlation detection scheme comprises cyclically shifting coefficients or received data to perform correlations at each time offset.

16. Method according to claim 14, further comprising a subdivision using multiple cross correlators wherein a magnitude of each sub-correlation is combined.

17. Method according to claim 14, further comprising a subdivision using multiple cross correlators wherein a phase of each sub-correlation is corrected by a phase rotation, and is then combined.

18. Method according to claim 1, wherein the first and/or second type of synchronization detection comprises an energy based detection scheme.

19. Method according to claim 18, wherein the first and/or second type of synchronization detection further comprises a subsequent correlation based detection.

* * * * *